(12) United States Patent
Jensen

(10) Patent No.: US 12,737,826 B2
(45) Date of Patent: Sep. 15, 2026

(54) FIELD CHANGE DETECTION AND ALERTING SYSTEM USING FIELD AVERAGE CROP TREND

(71) Applicant: Farmers Edge Inc., Winnipeg (CA)

(72) Inventor: Matthew Jensen, Winnipeg (CA)

(73) Assignee: Farmers Edge Inc., Winnipeg (CA)

( * ) Notice: Subject to any disclaimer, the term of this patent is extended or adjusted under 35 U.S.C. 154(b) by 310 days.

(21) Appl. No.: 17/829,517

(22) Filed: Jun. 1, 2022

(65) Prior Publication Data

US 2023/0017169 A1 Jan. 19, 2023

Related U.S. Application Data

(60) Provisional application No. 63/219,424, filed on Jul. 8, 2021.

(51) Int. Cl.

| | |
|---|---|
| ***G06Q 50/02*** | (2024.01) |
| ***G06Q 10/0639*** | (2023.01) |
| ***G06V 10/75*** | (2022.01) |
| ***G06V 20/10*** | (2022.01) |

(52) U.S. Cl.

CPC ....... *G06Q 50/02* (2013.01); *G06Q 10/06393* (2013.01); *G06V 10/751* (2022.01); *G06V 20/188* (2022.01)

(58) Field of Classification Search

None

See application file for complete search history.

(56) References Cited

U.S. PATENT DOCUMENTS

| | | | | |
|---|---|---|---|---|
| 2016/0180473 | A1* | 6/2016 | Groeneveld | A01C 21/00 705/7.25 |
| 2017/0228743 | A1* | 8/2017 | Cousins | G06Q 30/0202 |
| 2017/0332544 | A1* | 11/2017 | Conrad | G06N 20/00 |
| 2020/0173193 | A1* | 6/2020 | Southon | E05B 39/005 |
| 2021/0334829 | A1* | 10/2021 | Drexl | G06F 3/04842 |

* cited by examiner

*Primary Examiner* — Arif Ullah

(74) *Attorney, Agent, or Firm* — Ryan W. Dupuis; Kyle R. Satterthwaite; Ade & Company Inc.

(57) ABSTRACT

A system and method for detecting changes in an agricultural field uses a time series of target images of the agricultural field in which a vegetation index value is calculated for each target image. A target trend line is calculated from the time series of the vegetation index values. A time series of candidate images of one or more candidate fields having one or more attributes that correspond to one or more attributes of the agricultural field is also acquired in which an expected trend line can be determined from calculated vegetation index values representative of respective candidate images. An alert is generated in response to a deviation of the target trend line from the expected trend line that meets alert criteria.

17 Claims, 4 Drawing Sheets

FIELD CHANGE DETECTION AND ALERTING SYSTEM USING FIELD AVERAGE CROP TREND

This application claims the benefit under 35 U.S.C.119(e) of U.S. provisional application Ser. No. 63/219,424, filed Jul. 8, 2021.

FIELD OF THE INVENTION

The present invention relates to detection of changes in conditions within an agricultural field by calculating trends derived from time series data of remotely-sensed imagery.

BACKGROUND

With an ever-growing number of available imaging platforms, it is increasingly possible for users to get very high-frequency imagery over their Area of Interest (AOI). Commercial satellite platforms are now capable of offering sub-daily revisit frequencies, and the proliferation of commercial grade unmanned aerial platforms allows users to obtain their own imagery. However, this higher image frequency and data complexity also means it can be impractical for users to manually sort through and analyze all the available data. This is especially true for users in the agricultural industry, commonly referred to as growers.

Remotely-sensed image data and products derived from that data (i.e., imagery products) are being increasingly utilized in agriculture. This is because these data products can provide rapid, synoptic estimates of crop health condition over numerous agricultural acres. Crop health condition can be estimated using vegetation indices derived from the original image spectral data. One example vegetation index is the Normalized Difference Vegetation Index (NDVI) which can demonstrate high correlations with crop biomass, productivity, and eventual yield. NDVI and other imagery products can also provide quantitative and visual indications of deleterious crop conditions such as pest, disease, or weather (i.e. hail) damage, as well as the presence of weeds.

Despite the utility offered by these imagery products, manual inspection of images can be very time consuming and tedious. This can be particularly true for growers operating very large farming operations. Manual inspection of images and imagery products can also require expertise and experience to properly interpret the data. As such, analytic tools and algorithms can help create streamlined workflows and products that enable users to make better data driven decisions.

SUMMARY OF THE INVENTION

According to one aspect of the invention there is provided a method for detecting changes in an agricultural field, the method comprising:

- acquiring a time series of target images of the agricultural field;
- for each target image, calculating a vegetation index value representative of the target image to produce a time series of vegetation index values of the target images;
- calculating a target trend line from the time series of the vegetation index values of the target images;
- acquiring a time series of candidate images of one or more candidate fields having one or more attributes that correspond to one or more attributes of the agricultural field;

- for each candidate image, calculating a vegetation index value representative of the candidate image to produce a time series of the vegetation index values of the candidate images;
- calculating an expected trend line from the time series of the vegetation index values of the candidate images;
- comparing the target trend line to the expected trend line; and
- generating an alert in response to a deviation of the target trend line from the expected trend line that meets alert criteria.

According to a further aspect of the present invention there is provided a system for detecting changes in an agricultural field, the system comprising:

- a memory storing programming instructions thereon;
- at least one processor operably coupled to the memory so as execute the programming instruction whereby said at least one processor is configured to:
  - acquire a time series of target images of the agricultural field;
  - for each target image, calculate a vegetation index value representative of the target image to produce a time series of the vegetation index values of the target images;
  - calculate a target trend from the time series of the vegetation index values of the target images;
  - acquire a time series of candidate images of one or more candidate fields having one or more attributes that correspond to one or more attributes of the agricultural field;
  - for each candidate image, calculate a vegetation index value representative of the candidate image to produce a time series of the vegetation index values of the candidate images;
  - calculate an expected trend from the time series of the vegetation index values of the candidate images;
  - compare the target trend to the expected trend; and
  - generate an alert in response to a deviation of the target trend from the expected trend that meets alert criteria.

The Field Average Crop Trend (FACT) module is a means for computing and analyzing time-series data of satellite imagery to provide users with valuable insights to make data driven decisions. A time-series is an ordered sequence of discrete data points of a variable/feature through time. There are many potential satellite imagery derived data points that can be used for computing time-series. Every satellite image can be broken down into distinct layers called bands. Some common satellite bands are derived using sensors engineered to detect red (R), blue (B), green (G) and near-infrared (NIR) radiation from the electromagnetic spectrum. Any of these individual bands, or any other band the satellite image contains, is a potentially viable source for creating and analyzing time-series data with FACT. Any of the available imagery bands may also be combined into meaningful indices, one such example is the Vegetation Index (VI) known as Normalized Difference Vegetation Index (NDVI). Any of these derived indices are a potentially viable source for creating and analyzing time-series data with FACT. For example, one embodiment of FACT can utilize NDVI time-series data over agricultural fields to monitor crop condition and gain valuable insights. An agricultural field can be delineated as a discrete agricultural zone with a single homogenous crop and will be hereafter referred to as a field.

One embodiment of FACT can utilize time-series data from a target field to create a target trend and compare that target trend to an expected trend; the expected trend is computed from candidate fields that share similar attributes as the target field. One embodiment of FACT can utilize time-series data to compute a target trend and expected trend. The target trend is computed from time-series data over a target field. The expected trend is computed by combining time-series data of candidate fields. Candidate fields are fields that share similar attributes as the target field (ie: crop type, spatial proximity, etc.). By comparing the trend of the target field (target trend) to that of the candidate fields (expected trend), we can analyze the relationship between these two signals to give valuable insights. Such insights may include growth stage development, rates of change (e.g., green-up and senesce rates), crop stress, weather events, crop predictions such as yield, etc. Furthermore, the data computed and stored by FACT processes can enable further in-depth analysis to occur.

The system and method may be further configured to identify the one or more candidate fields by identifying fields having (i) at least one attribute matching a corresponding attribute of said agricultural field and (ii) a distance from said agricultural field that is less than a prescribed distance threshold.

The system and method may be further configured to identify the one or more candidate fields by identifying fields having (i) a crop type matching a crop type of said agricultural field, (ii) accessible weather data arranged to be associated with each candidate image, and (iii) a distance from said agricultural field that is less than a prescribed distance threshold.

The system and method may be further configured to compute the target trend line as a best fit line from the vegetation index values of the target images and computing the expected trend line as a best fit line from the vegetation index values of the candidate images.

The system and method may be further configured to: (i) for each target image, calculate a single vegetation index value to represent that target image from an array of index values associated with that target image; (ii) calculate the target trend line from the single vegetation index values of the target images; (iii) for each candidate image, calculate a single vegetation index value to represent that candidate image from an array of index values associated with that candidate image; and (iv) calculate the expected trend line from the single vegetation index values of the candidate images.

Each single vegetation index value may be a mean value calculated from the associated array of index values.

The system and method may be further configured to: (i) identify outlier index values among the single vegetation index values as index values that have a distance from a corresponding one of the target trend line and the expected trend line that exceeds a prescribed outlier threshold; and (ii) recalculate the trend lines by ignoring the outlier index values.

The system and method may be further configured to align growth stages of the time series of candidate images of the one or more candidate fields to growth stages of the time series of target images of the agricultural field prior to calculating and comparing the trend lines.

The system and method may be further configured to identify the one or more candidate fields by identifying candidate fields having a seeding date and daily temperature values associated therewith, wherein the step of aligning growth stages of the time series of candidate images of the one or more candidate fields to growth stages of the time series of target images of the agricultural field further comprises: (i) calculating a growing degree days metric associated with the candidate images using the seeding date and the daily temperature values as inputs into a growth stage model; and (ii) aligning the growth stages of the candidate images with the growth stages of the target images using the calculated growing degree days metric.

The system and method may be further configured to calculate and insert one or more synthetic index values into one or more corresponding gaps in the time series of vegetation index values from which the target trend line is calculated.

The system and method may be further configured to: (a) calculate each synthetic index value by calculating a synthetic trend line from the time series of vegetation index values of the target images and locating where the synthetic trend line intersects the corresponding gap in the time series of vegetation values; and (b) calculate the target trend line as a best fit line from the time series of vegetation index values and the synthetic index values resulting from step (a). The system and method may be further configured to perform multiple iterations of step (a) in which the current synthetic trend line is calculated as a best fit line using (i) the time series of vegetation index values and (ii) the synthetic index values determined from a previous iteration of step (a).

The system and method may be further configured to: (i) acquire the time series of candidate images of a plurality of candidate fields; (ii) identify preferred candidate fields among the plurality of candidate fields; and (iii) calculate the expected trend line using only the time series candidate images from the preferred candidate fields.

The system and method may be further configured to: (a) for each candidate field, (i) calculate a candidate trend line from the time series of candidate images of that candidate field and (ii) calculate a difference value by comparing the candidate trend line to the target trend line; and (b) use the difference values to identify the preferred candidate fields.

The system and method may be further configured to calculate the difference value for each candidate field using a portion of the candidate trend line representing only a subset of the time series of candidate images associated with the candidate field.

The system and method may be further configured to align growth stages of the candidate trend lines of the preferred candidate fields prior to calculating the expected trend line from the preferred candidate fields.

The system and method may be further configured to calculate a representative value by comparing the target trend line to the expected trend line, and generate the alert when the representative value meets an alert threshold defining the alert criteria.

The system and method may be further configured to: (i) calculate a trend difference value as a difference between the target trend line and the expected trend line at spaced apart intervals of time; and (ii) calculate the representative value based upon an amount of change in the trend difference value by comparing the trend difference value of the current interval to the trend difference value of a previous interval When the alert criteria include an upper alert threshold and a lower alert threshold, the system and method may be further configured to: (i) generate an alert when the representative value exceeds the upper alert threshold indicative of the target trend line increasing at a faster rate than the expected trend line or the target trend line decreasing at a slower rate than the expected trend line; and (ii) generate an alert when the representative value falls below a lower alert threshold indicative of the target trend line decreasing at a faster rate than the expected trend line or the target trend line increasing at a slower rate than the expected trend line.

BRIEF DESCRIPTION OF THE DRAWINGS

One embodiment of the invention will now be described in conjunction with the accompanying drawings in which:

FIG. 3(*b*) illustrates a trend difference calculated as the difference between the target trend line and the expected trend line.

FIG. 3(*c*) illustrates calculation of a syndex value representing an amount of change in the trend difference shown in FIG. 3(*b*).

In the drawings like characters of reference indicate corresponding parts in the different figures.

DETAILED DESCRIPTION

Figure 1:
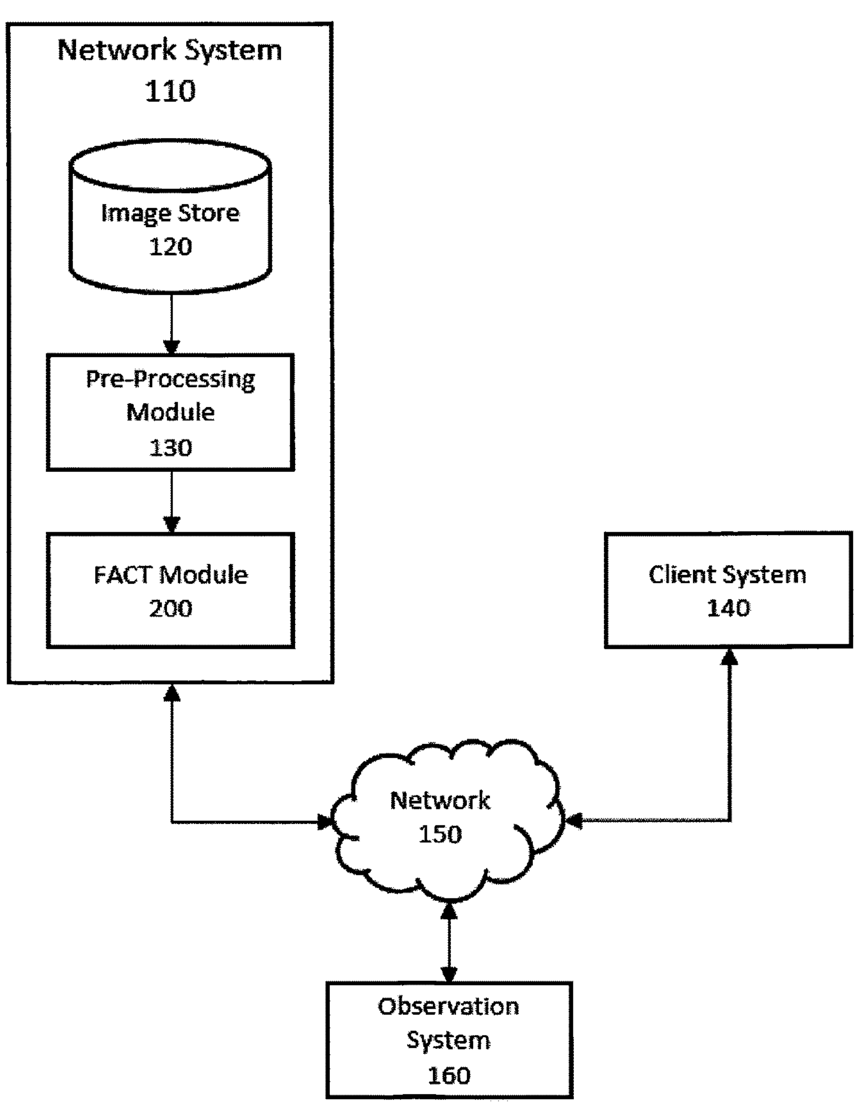
FIG. 1 illustrates a system environment for running the Field Average Crop Trend (FACT) processes over an agricultural field using remotely sensed image products, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable similar or like reference numbers may be used in the figures and may indicate similar or like functionality. The figures depict embodiments of the disclosed system (or method) for purposes of illustration only.

Overview

Field Average Crop Trend (FACT) module is a means for computing and analyzing time-series data of satellite imagery to provide users with valuable insights to make data driven decisions. The following list provides a general overview of the various parts of the FACT processes:

- (i) Candidate Filtering Process 201: Identify other agricultural fields in the AOI that have similar attributes to the target field (ie: same crop type); they will be known as candidate fields.
- (ii) Image Selection Process 202: Select the images best suited for FACT processing.
- (iii) Image Processing 203: Calculate NDVI over the target field and all candidate fields. For the target field and each candidate field, create a NDVI time-series using the mean NDVI value of each image. Apply NDVI calibration when needed.
- (iv) Outlier Filter Process: Compute the trend for the mean NDVI time-series dataset. A mean NDVI value is considered an outlier if its value is greater than a critical distance threshold from the trend. Any outlier values will be ignored from future processing.
- (v) Alignment Process 205: Every field, even those with the same crop, will progress through their natural growth stages at different rates. This variation in growth stages can lead to significant differences in NDVI values between fields on any given day. Thus, NDVI time-series data needs to be aligned in order to an accurate comparison. Growing degree-days (GDD) is used to align the datasets.
- (vi) Field Trend Process 206: Compute a trend line using the cleaned mean NDVI time-series data of the target field or any other field as needed. Synthetic points and/or multiple iteration methods may be used. Trends are computed using Trend Module 220
- (vii) Top Candidate Process 207: Identify the top candidate fields that best match the target trend. By computing the difference between the candidate field trend and the target field trend we can identify candidate fields that closely match the target trend. Top candidate fields are any candidate fields where their NDVI time-series trend has minimal difference from the target trend. Only the top candidate fields are used in the computation of the expected trend.
- (viii) Expected Trend Process 208: Using the daily NDVI time-series data from the top candidate fields, compute the median NDVI value for each day. With daily median NDVI values, compute the expected trend using the Trend Module 220.
- (ix) Syndex Process 209: Compute the syndex value by comparing the target trend and expected trend.
- (x) Alert Process: When the Syndex value surpasses critical thresholds, it can indicate a significant divergence in the relationship between the target trend and expected trend. This divergence can 'alert' the user to take action, trigger subsequent systems, or any other numerous possibilities.

System Environment 100

FIG. 1 illustrates a system environment for running FACT processes over an agricultural field using remotely sensed image products, according to one example embodiment. Within the system environment 100 is an observation system 160, network system 110, client system 140, and a network 150 which links the different systems together. The network system 110 includes an image store 120, Pre-processing module 130, and FACT module 200.

Other examples of a system environment are possible. For example, in various embodiments, the system environment 100 may include additional or fewer systems. To illustrate, a single client system may be responsible for multiple agricultural fields. The network system may leverage observations from multiple observation systems 160 to detect crop change for each of the agricultural fields. Furthermore, the capabilities attributed to one system within the environment may be distributed to one or more other systems within the system environment 100. For example, the FACT module 200 may be executed on the client system 140 rather than the network system 110.

An observation system 160 is a system which provides remotely-sensed data of an agricultural field. In an embodiment, the remotely-sensed data is an observed image. Herein, an observed image is an image or photograph of an agricultural field taken from a remote sensing platform (e.g. an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of the crop conditions within an agricultural field in the image.

The observation system 160 may provide images of an agricultural field over a network 150 to the network system 110, wherein said images may be stored in the image store 120. Additionally or alternatively, imagery derivatives generated by the pre-processing module 130, or FACT module 200 may also be stored in the image store 120.

The pre-processing module 130 inputs an observed image and outputs a pre-processed image. The observed image may be accessed from the image store 120 or directly received from the observation system 160. A pre-processed image is the observed image that has been pre-processed for the FACT module 200.

The FACT module 200 uses the pre-processed image to run FACT processes. If certain criteria are met, the FACT module will generate various image derivates to be transmitted to the client system 140 via a network 150.

Imagery Pre-Processing Module

The pre-processing of images provided by the observation system 160 or retrieved from the image store 120 is performed using the pre-processing module 130. Pre-processing is performed to ensure images are suitable for use in the FACT module. Atmospheric correction and image filtering is the main purpose for the pre-processing module 130.

There are numerous reasons why an image may be unsuitable. Pixel values in an observed image obtained from a remote sensing platform are a measurement of electromagnetic radiation (EMR) originating from the sun (a quantity hereafter referred to as radiance), passing through the atmosphere, being reflected from objects on the Earth's surface (i.e. an agricultural field), then passing through part or all of the atmosphere once again before being received by a remote sensor (a quantity hereafter referred to as radiance). The proportion of radiance received by ground objects relative to the irradiance received by these objects (a measure hereafter referred to as surface reflectance) is of primary interest to remote sensing applications, as this quantity may provide information on the characteristics of these objects. However, atmospheric effects can introduce detrimental impacts on the measured EMR signal in an observed image which can render some or all the image pixels inconsistent, inaccurate, and, generally, untenable for use in accurate detection of crop health condition changes.

Atmospheric scattering and absorption are major sources of error in surface reflectance measurements. This effect is caused when molecules in the atmosphere absorb and scatter EMR. This scattering and absorption occurs in a wavelength-dependent fashion, and impacts EMR both during its initial transmission through the atmosphere, as well as after it is reflected from the Earth's surface and received by the remote sensing platform. Atmospheric absorption and scattering can cause various deleterious effects, including: some EMR from the sun not making it to objects on the ground; some EMR from the sun scattering back into the remote sensor before reaching the ground; some EMR reflected from the ground not reaching the remote sensor. While the EMR output from the sun is well understood and relatively invariant, atmospheric scattering and absorption can vary markedly both over time and space, depends on the type and amount of atmospheric molecules, and also depends on the path length of the EMR transmission through the atmosphere.

One adjustment for atmospheric effects is a correction of raw image data to top-of-atmosphere (TOA) reflectance units, a quantity hereafter referred to TOA reflectance. This correction converts the radiance measured by the sensor to TOA reflectance units expressed as the ratio between the radiance being received at the sensor and the irradiance from the sun, with a correction applied based on the path of the EMR both from the sun to the target as well as from the target to the remote sensor. This first order correction can mitigate for some broad temporal and spatial attenuation of EMR transmission from the atmosphere but does not account for the variable absorption and scattering which can occur from variations in the atmospheric constituent particles.

A second order correction, referred to here as atmospheric correction, attempts to mitigate and reduce the uncertainties associated with atmospheric scattering and absorption. A range of atmospheric correction techniques of varying complexity have been employed within the field of remote sensing. These techniques are well known to a person skilled in the art and are consequently not further discussed here. The end result from atmospheric correction is an estimate of surface reflectance. To mitigate the impact of atmospheric scattering and absorption, in some embodiments the image pre-processing module 130 may employ either TOA or atmospheric correction techniques.

Another source of uncertainty which may impact observed image quality is the presence of atmospheric clouds or haze, and shadows cast from clouds, which can occlude ground objects and/or attenuate the radiance reflected from these objects. As such, the pre-processing module 130 may utilize a cloud and/or shadow masking technique to detect pixels afflicted by these effects. Many techniques exist within the discipline for cloud and shadow masking and are also well known to a person skilled in the art.

The pre-processing module 130 may also remove pixels from an observed image (e.g., using cropping, selective deletion, etc.). For example, an observed image may include obstacles or structures (e.g., farm houses, roads, farm equipment) that may be detrimental to assessment of the condition of crops within the field. The pre-processing module 130 may remove the impacted pixels via cropping them from the observed image or by flagging those pixels as invalid via a mask layer. Pixels impacted by clouds, shadows, and/or haze as detected by a cloud and shadow detection algorithm can also be removed/flagged in a similar fashion. The resulting image is an image that provides more accurate data for analyzing crop condition.

Images that have been processed through the pre-processing module 130 are hereafter referred to as pre-processed images.

FACT Module 200

Figure 2:
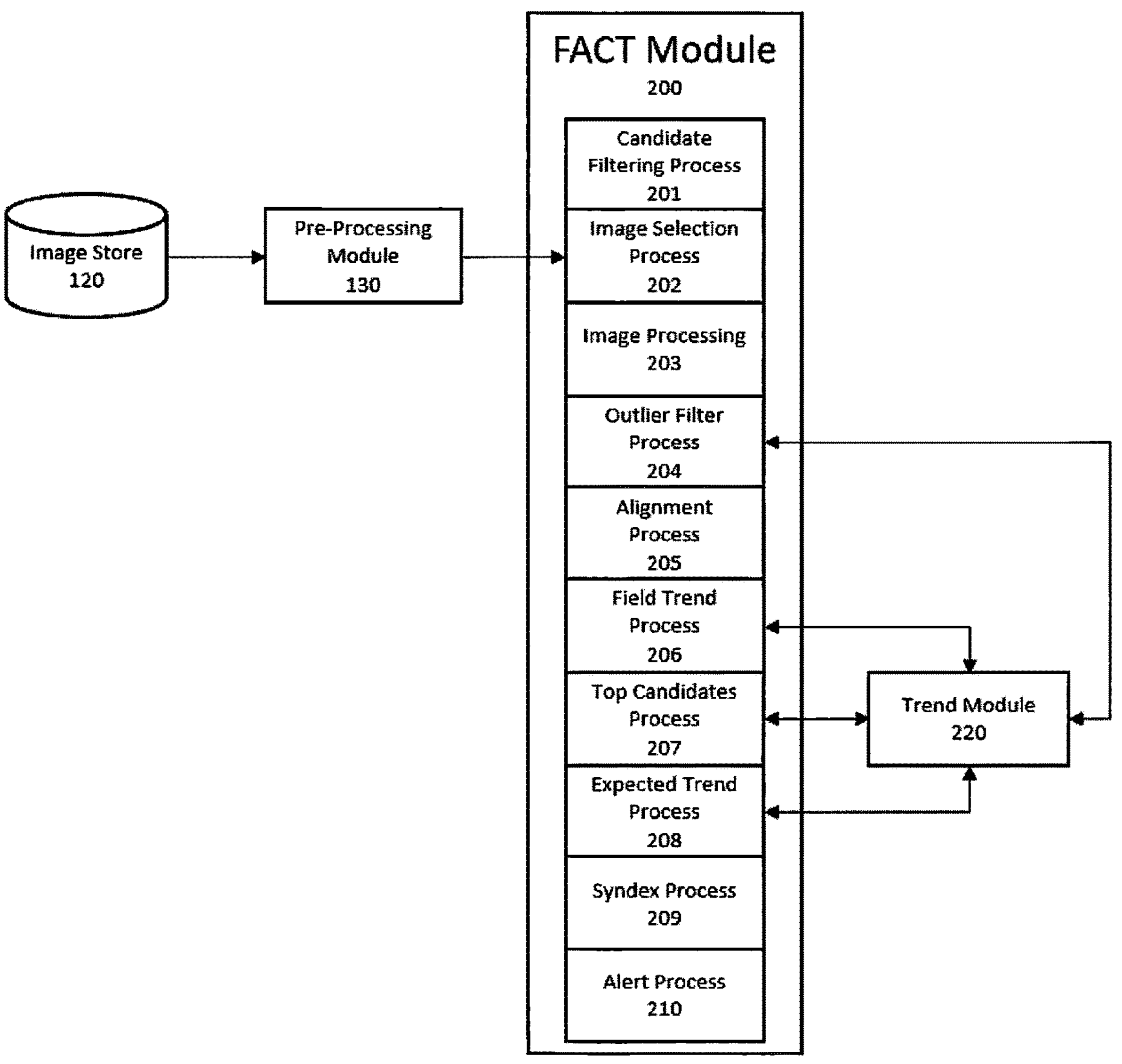
FIG. 2 illustrates the processes required to run the FACT Module.

FIG. 2 illustrates the processes required to run the FACT Module 200. FACT Module 200 may be referred to as FACT module or simply FACT. The FACT module is a means for computing and analyzing time-series data of satellite imagery over agricultural fields to provide users with valuable insights to make data driven decisions. FACT can utilize any satellite sensor bands or any indices derived from those bands in its processes and analysis. For simplicity and consistency purposes, this embodiment of the FACT will utilize NDVI time-series data from a target field and candidate fields.

The target field is the agricultural field upon which the user desires to gain valuable insights. Candidate fields are agricultural fields that share similar attributes with the target field. Some similar attributes the target and candidate fields may share are: crop type, spatial proximity, soil characteristics, irrigation practices, etc. By utilizing NDVI time-series data over the target field, FACT can create a target trend that reflects daily NDVI averages over the target field; candidate trends can be computed with similar process over candidate fields. When candidate trends are combined into a single trend it will be referred to as the expected trend. By analyzing the relationship between the NDVI trend of the target field (target trend) and the combined NDVI trends of the candidate fields (expected trend) we can gain valuable insights between these two signals. Such insights may include growth stage development, rates of change (e.g., green-up and senesce rates), crop condition, weather events, crop predictions such as yield, and more. These insights not only allow growers to make data driven decisions regarding their agricultural operation, but it also helps streamline their daily workflows and productivity. Furthermore, the data and analytics computed by FACT can enable other agricultural analysis, such as detecting anomalies (e.g., crop stress) within a field.

Candidate Filtering Process 201

Candidate Filtering Process 201, or simply candidate filtering, is the first processing step in FACT module 200. Candidate filtering is the process of classifying a candidate field as either a valid or invalid candidate field. Classification of a candidate field as either valid or invalid is based on how closely a candidate field's attributes match those of the target field. For this embodiment of FACT, we will assume a hypothetical target field has the following attributes: (i) Crop: Canola; (ii) Seed variety: DKTC 92 SC; (iii) Seeding date: May 22, 2019; (iv) Irrigated: False; (v) Soil: Loam; (vi) Location: X,Y (latitude/longitude of field centroid); (vii) Temperature/weather data: True; and (viii) Hail date: Jul. 15, 2019.

A target fields attributes are in no way restricted to the above attribute list; any other potential field attributes may be added (or removed) from a field attribute list and would be considered valid attributes.

For this embodiment, FACT will assume any candidate fields that have the same crop, are within D distance from location X, Y, and have daily temperature and weather data are valid candidate fields. The variable D is the maximum distance from which the candidate field can be from the target fields location of X, Y. One embodiment of FACT allows for an iterative approach to gradually increase the size of D until a minimum number of good candidate fields are identified. User discretion is used to determine the size of D and the minimum required candidate fields. For this embodiment we will assume a maximum search distance D of 100 km and a minimum of 1 required candidate field. Any candidate fields identified as invalid through the candidate filtering process will not be used in further FACT analysis. At least 1 candidate field must be considered as valid for FACT processing to continue.

Image Selection Process 202

Image Selection Process 202, or simply image selection, is the process of selecting images from the pool of pre-processed images as computed in Pre-Processing Module 130. A pre-processed image can be classified as either valid or invalid based on image selection criteria. One embodiment of FACT may use percent field coverage and/or percent invalid pixels of the pre-processed image as image selection criteria. Percent field coverage refers to the percentage of field that is covered by the pre-processed image. Percent invalid pixels refers to the percentage of pixels in the pre-processed image, within the candidate field or target field, that are classified/flagged/removed/deleted or otherwise deemed invalid by the Pre-Processing Module 130. If a pre-processed image does not meet the percent field coverage and/or percent invalid pixels thresholds, set at the user's discretion, it is considered invalid and removed from further processing by FACT. For example, one embodiment of FACT indicates that a valid pre-processed image must cover at least 50% of the field and include no more than 5% invalid pixels; however, other thresholds can be used while still yielding effective results. Pre-processed images that are considered valid by Image Selection Process 202 will be hereafter referred to as selected images.

Image Processing 203

Image Processing 203, or simply image processing, is the process of transforming the selected images (as produced by Image Selection Process 202) into imagery derivates and discrete data values suitable for time-series analysis.

One embodiment of FACT image processing may apply a calibration correction/coefficient between selected images where their imagery source/sensors are different. For example, applying a calibration coefficient between a Sentinel 2 satellite selected image and SPOT 6 satellite selected image are more closely aligned in their values. Another example is applying a calibration coefficient between Dove-classic and Dove-R satellites.

Image processing may also include the calculation of a vegetation index (VI) for the selected images. Vegetation indices have long been used for remote sensing of vegetation since they often demonstrate high correlations with vegetation properties of interest, such as biomass, photosynthetic activity, crop yield, etc. As an example, Image Processing 203 may compute the Normalized Difference Vegetation Index (NDVI). The NDVI is calculated by:

$$NDVI = \frac{(NIR - \text{Red})}{(NIR + \text{Red})}$$

where NIR is the image reflectance in the near infrared (NIR) band, and Red is the image reflectance in the Red band. The NDVI is expressed as a decimal value between −1 and 1. NDVI values in the range of 0.2 to 0.8 or higher are typically considered an indication of active vegetation, with higher values being correlated with higher biomass, photosynthetic activity, etc. For this embodiment FACT will utilize NDVI in its processing, however, other embodiments may utilize the individual bands or any other vegetation index or combination of indices.

In order for selected images to be suitable for time-series analysis, Image Processing 203 must condense the selected images into single discrete values. This embodiment of FACT will utilize the mean value as a method of condensing the selected image into a discrete value suitable for time-series analysis. However, other embodiments may also be utilized such as the median value of each selected image.

For this embodiment of FACT, Image Processing 203 will calculate the NDVI for each selected image and then calculate the mean NDVI value for each. The mean NDVI value of each selected image will be utilized by subsequent FACT processes and will be simply referred to as the mean NDVI value. See FIG. 3*a* for examples of mean NDVI values.

Trend Module 220

Trend Module 220 is a least-square regression algorithm that takes an array of data values and other user defined parameters to compute a best fit line for the data. There are many open-source models and algorithms to do this computation. The Savitzky-Golay filter and locally weighted scatterplot smoothing (LOWESS) are just a few examples of commonly used algorithms used to compute a bit fit line, or trend line, for an array of data values. For this embodiment of FACT, the Savitzky-Golay filter as documented and computed in Soipy's signal processing module (scipy.signal.savgol_filter) will be used with a polynomial order (polyorder) of 3. The window_length parameter determines the number of coefficients and the values varies depending on which FACT process is being run. Any best fit lines produced using any valid Trend Module 220 algorithm will be referred to as the trend or trend line of the data.

Outlier Filter Process 204

The Outlier Filter Process 204, or simply outlier filter, is the process of filtering/flagging mean NDVI values, as computed by Image Processing 203, as outliers or not. The outlier filter utilizes the Trend Module 220 to compute a trend line for a mean NDVI time-series. One embodiment of Outlier Filter Process 204 passes a dynamic window size to Trend Module 220. The window size is calculated by:

$$\text{int(window)} = \left(\frac{\text{length (mean\_NDVI\_values)}}{500}\right) * 101$$

This is just one method of calculating the window size. Any other methods or a static window size is optional. Trend Module 220 requires the window size to be an odd number; simply +1 to any window that is even.

Once a trend line is computed, each NDVI value used to compute the trend is assigned a NDVI difference value. The NDVI difference value is calculated by taking the difference between the mean NDVI value and the trend value at a given point.

$$NDVI\ \text{difference} = \text{mean\_NDVI\_value} - \text{trend\_value}$$

If the NDVI difference value for a mean NDVI exceeds a critical threshold it will be flagged as an outlier in the mean NDVI dataset and should be ignored in any future FACT processes. In one example, the critical NDVI difference thresholds of −0.05 and +0.07 were used; however, other thresholds can be used while still yielding effective results. Any mean NDVI values flagged as an outlier will be removed from subsequent FACT processing. The outlier filtering process occurs for all mean NDVI datasets of the candidate fields and the target field. The resulting mean NDVI time-series dataset is now free of outlier data points that may impact future processing and will be hereafter referred to as the mean NDVI values. See FIG. 3*a* for examples of filtered points.

Other potential outlier filter methods_exist and should be considered as potential FACT embodiments.

Alignment Process 205

Alignment Process 205, or simply alignment, is the process of aligning each candidate fields mean NDVI time-series to the mean NDVI time-series of the target field. Every field, even those with the same crop, will progress through their natural growth stages at different rates. This variation in growth stages can lead to significant differences in NDVI values between fields on any given day. Thus, NDVI time-series data based on calendar dates is inadequate and the data needs to be properly aligned prior to performing any trend comparisons. One embodiment of FACT utilizes the growing degree days (GDD) metric as a means for alignment. Plants require a specific amount of heat to develop from one stage to the next. GDD is a way of tracking plant growth by assigning a heat value to each day. GDD can be computed by using the seeding date and daily temperature values of the field as inputs into a growth stage (GS) model. The accumulation of GDD values can be used to determine a crops GS (Miller et al., 2001).

By aligning all candidate fields and the target field based on GDD instead of calendar day we remove potential sources of error and misalignment between our candidate fields NDVI values and the target field NDVI values. One embodiment of FACT can convert the GDD aligned NDVI values back to calendar date and still maintain the benefits of GDD alignment. As previously noted, each calendar day can be assigned a GDD. Thus, each calendar day for the target field will have a GDD value; this is known as the target fields GDD/calendar date relationship. Since every candidate field has a GDD value, we can assign their GDD value a new calendar date based on the target fields GDD/calendar date relationship. For example, on July $1^{st}$ the target field may have a GDD value of 500. This means all candidate fields with a GDD value of 500 will be assigned a calendar date of July $1^{st}$.

An alternative to Alignment Process 205 would be to do a cross-correlation between the target field trend and each candidate field trend. This method does not require GDD and thus may be considered as an alternative alignment method if seeding date and temperature data are not available. This cross-correlation method would produce an offset value that could be applied to the candidate field trends to produce better alignment. (Cross-correlation would only occur on a subset of the trends/data to maximize the benefits/accuracy). However, this method would require Alignment Process 205 to be interjected into the middle of Top Candidates Process 207.

Other alignment processes exist and should be considered as potential alternatives for Alignment Process 205.

Field Trend Process 206

Field Trend Process 206, or simply field trend process, is the process of computing the target trend from the target field mean NDVI values. One embodiment of the field trend process is to simply input the target fields mean NDVI values into Trend Module 220 to produce the output target trend values.

The standard window size used in Trend Module 220 is 21, but any other valid window size should be considered as potential embodiments for FACT and Field Trend Process 206.

Another embodiment of Field Trend Process 206 is to add synthetic mean NDVI values to the target fields mean NDVI dataset prior to running Trend Module 220. A synthetic mean NDVI value, or synthetic point, is a mean NDVI data value that is interjected into the existing mean NDVI time-series dataset. The value of the synthetic point (y-value) is determined by Trend Module 220. By running Trend Module 220 with a larger window size, for example 51, the resulting trend is less prone to outliers and gaps in the data. However, the resulting trend may oversimplify the mean NDVI values and lose some of the potential signal in the data. The trend resulting from running Trend Module 220 with a larger window size will be referred to as the synthetic trend. The index (x-value) within the mean NDVI time-series is based on user preference. An embodiment of FACT may only insert a synthetic value whenever there is a significant gap in the mean NDVI time-series. An example of a significant gap in mean NDVI values may be any instance where there is no mean NDVI value for 6+ calendar days. Thus, a synthetic point may be inserted into this data gap at the desired index (x-index). Once the synthetic point insertion locations (x-index) been determined; the y-value can be extracted from the synthetic trend at the same x-index in the synthetic trend. This results in mean NDVI dataset that has a synthetic point inserted at x-index with a y-value from the synthetic trend at the same x-index. See FIG. 3 part (a) for examples of synthetic point insertion.

Synthetic points can have a beneficial impact on the target trend. One potential benefit of adding synthetic points is stability in the target trend. Depending on the frequency of mean NDVI values and/or their precision and accuracy, the target trend can potentially behave unexpectedly. This is evident in cases where there are large gaps between mean NDVI values. Adding synthetic points can help alleviate this unexpected behavior by bringing stability to the trend.

Another embodiment of Field Trend Process 206 is to run multiple iterations of Field Trend Module 220; using the previous iterations results as inputs for the next iteration. The iterations of Field Trend Module 220 may result in more refined and polished trends with minimal signal loss. Each iteration of Field Trend Module 220 may use the same window size as before or it may be changed every iteration or any other valid combination of window sizes.

Any of the forementioned field trend processes or any combination thereof are considered as valid embodiments of Field Trend Process 206. Any other potential method relating to Field Trend Process 206 should be considered as a valid embodiment. Processes utilized in Field Trend Process 206 may also be used to compute a trend on any other valid datasets.

Top Candidates Process 207

Top Candidates Process 207, or simply top candidate process, is the process of identifying the top candidate fields from the candidate fields as output by Candidate Filtering Process 201. This process is done by first ranking the candidate fields based on how well they match the target trend as computed in Field Trend Process 206; then selecting the top candidate fields based on their rank. Each candidate trend can be computed by following the processing steps in Field Trend Process 206 or the user may choose to use the trend computed for each candidate in Outlier Filter Process 204.

One embodiment for ranking candidate fields is by calculating the mean absolute difference between the candidate trend and the target trend. The mean absolute difference is referred to as the candidate trend difference and is calculated by:

$$\text{candidate trend difference} = \text{mean}(\text{abs}(\text{candidate}_{trend} - \text{target}_{trend}))$$

The candidate trend difference value can be calculated using the full trends of both the candidate field and the target field or from a subset of a trend. For example, a FACT embodiment of Top Candidates Process 207 may only compute the candidate trend difference where portions of the candidate and target trend have a mean NDVI value>0.25 and up to a given calendar date (or GDD). With the candidate trend difference computed for each candidate field, the candidate fields can be ranked in descending order based on their candidate trend difference score. Those candidate fields with lower candidate trend difference are ranked higher and considered closer matches to the target trend. Computing the median absolute difference or sum of the absolute differences are other potential methods for scoring and ranking candidate trends. Other methods for ranking candidate fields exist and should be considered as valid embodiments of Top Candidates Process 207. Once the method for ranking candidate fields has been completed, the selection of the top candidate fields can begin.

One embodiment for identifying top candidate fields in Top Candidates Process 207 simply takes the top X candidate fields with the lowest score (ie: lowest candidate trend difference). Where X is the desired number of top candidate fields to use. Another embodiment of Top Candidates Process 207 identifies top candidates by implementing a critical threshold value. Simply put, any candidate field with a candidate trend difference less-than a critical threshold value would be considered a top candidate. An embodiment of Top Candidates Process 207 may use a critical threshold value of 0.038 for candidate trend difference. There are many methods or combination of methods to identify top candidates in the Top Candidate Process 207 that should be considered as valid embodiments of Top Candidate Process 207.

The top candidate fields identified by Top Candidate Process 207 are hereafter known as the top candidate fields.

Expected Trend Process 208

Expected Trend Process 208, or simply the expected trend process, is the process of combining the trends of the top candidate fields, as identified by Top Candidate Process 207, into a single expected trend. First, combine the top candidate trends into a combined NDVI time-series dataset. Second, use the combined top candidate dataset to compute the expected trend.

One embodiment of FACT combines the top candidate trends using the median method. This is done by simply computing the median NDVI value per GDD (or calendar day) of the top candidate fields. This results in a single median NDVI value per GDD (or calendar day). Other embodiments of FACT may utilize other methods, such as mean, to combine the top candidate trends in Expected Trend Process 208. The result of combining the top candidate trends is hereafter referred to as the combine NDVI dataset.

The combined NDVI dataset is then used to compute the expected trend. One embodiment of FACT may feed the combined NDVI dataset directly into Trend Module 220 to compute the expected trend. Another embodiment may utilize the trend computation processes as outlined in Field Trend Process 206 to compute the expected trend. Other embodiments exist that will allow the expected trend to be computed using other time-series datasets.

Expected Trend Process 208 produces what is referred to as the expected trend.

Syndex Process 209

Syndex Process 209 is the process of computing the syndex value. The syndex is computed by comparing the target trend and the expected trend. Recall, the target trend is computed by feeding the target field mean NDVI dataset into Field Trend Process 206 and the expected trend is computed by the expected Trend Process 208.

The first step to computing syndex is to compute the trend difference. Trend difference is computed by:

$$\text{trend difference} = \text{target}_{trend} - \text{expected}_{trend}$$

Where the target trend trend is the time-series dataset of the target trend, and the expected trend is the time-series dataset of the expected trend. See FIG. 3 part (b) for illustration of trend difference.

Next, syndex is computed by analyzing trend difference at a given window size. The window size used to compute syndex will hereafter be referred to as the syndex window (w). One embodiment of FACT utilizes a syndex window of 7. As illustrated in the following equation, syndex is computed by looking at the change in trend difference at a given syndex window divided by 0.2.

$$syndex_i = \frac{(\text{trend difference}_i - \text{trend difference}_{i-w})}{0.2}$$

Where trend $\text{difference}_i$ is the value of trend difference at index i and trend $\text{difference}_{i-w}$ is the trend difference value at index i-syndex window (w).

Figure 3:
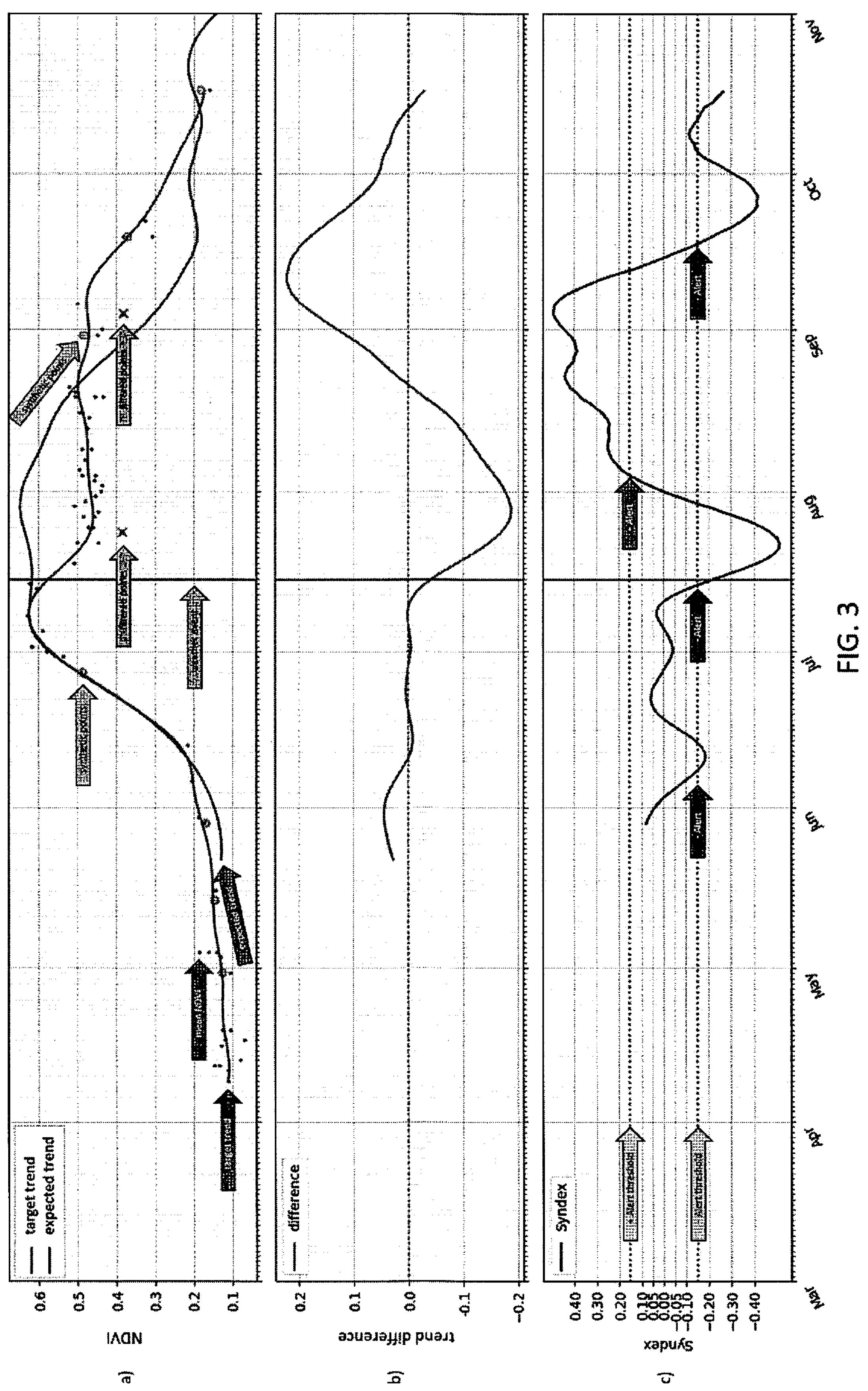
FIG. 3(*a*) illustrates a comparison between the target trend line and the expected trend line utilizing mean NDVI values, and including examples of filtered data points and inserted synthetic data points.

See FIG. 3 part (c) for illustration of the computed syndex value over the entire time-series dataset.

Alert Process 210

Alert Process 210, or simply alert process, is the process of alerting/flagging instances where the syndex value passes a critical threshold. This critical syndex threshold will be referred to as an alert threshold. The number of alert thresholds and their value can vary depending upon application, syndex window size used in Syndex Process 209, and other factors. For this embodiment of FACT, two alert thresholds were used.

The first alert threshold used in this embodiment is +0.15 syndex and is referred to as the +alert threshold. See FIG. 3 part (c) for illustration. This threshold is used to indicate when the relationship between the target trend and the expected trend changes in favor for the target trend. Typically, this threshold is triggered when the trend difference, as computed in Syndex Process 209, increases in relation to previous values. This can occur when the target trend values increase at a faster rate than the expected trend and/or when the target trend values decrease at a slower rate than the expected trend. There are other possible scenarios where the +alert threshold is triggered.

The second alert threshold used in this embodiment is −0.15 syndex and is referred to as the −alert threshold. See FIG. 3 part (c) for illustration. This threshold is used to indicate when the relationship between the target trend and the expected trend changes in favor for the expected trend. Typically, this threshold is triggered when the trend difference, as computed in Syndex Process 209, decreases in relation to previous values. This can occur when the target trend values decrease at a faster rate than the expected trend and/or when the target trend values increase at a slower rate than the expected trend. There are other possible scenarios where the −alert threshold is triggered.

Any other alert threshold or variation to Alert Process 210 should be considered as an alternative FACT embodiment.

Products

There are many potential products that can be either directly or indirectly linked to FACT Module 200. Any of the outputs, and/or any possible derivates from the analysis (graphics/charts/drawings/etc.), and/or any insights stemming from FACT Module 200 may be distributed through the System Environment 100 and will hereafter be referred to as the products.

Some examples of insights may include growth stage development, rates of change (e.g., green-up and senesce rates), crop condition, weather events, crop predictions such as yield, and more. These insights not only allow growers to make data driven decisions regarding their agricultural operation, but it also helps streamline their daily workflows and productivity. Furthermore, the data and analytics computed by FACT can enable other agricultural analysis, such as detecting anomalies (e.g., crop stress) within a field.

The products may be delivered though System Environment 100 at any point doing the process and/or when an alert threshold is exceeded in Alert Process 210.

Example Computer System

Figure 4:
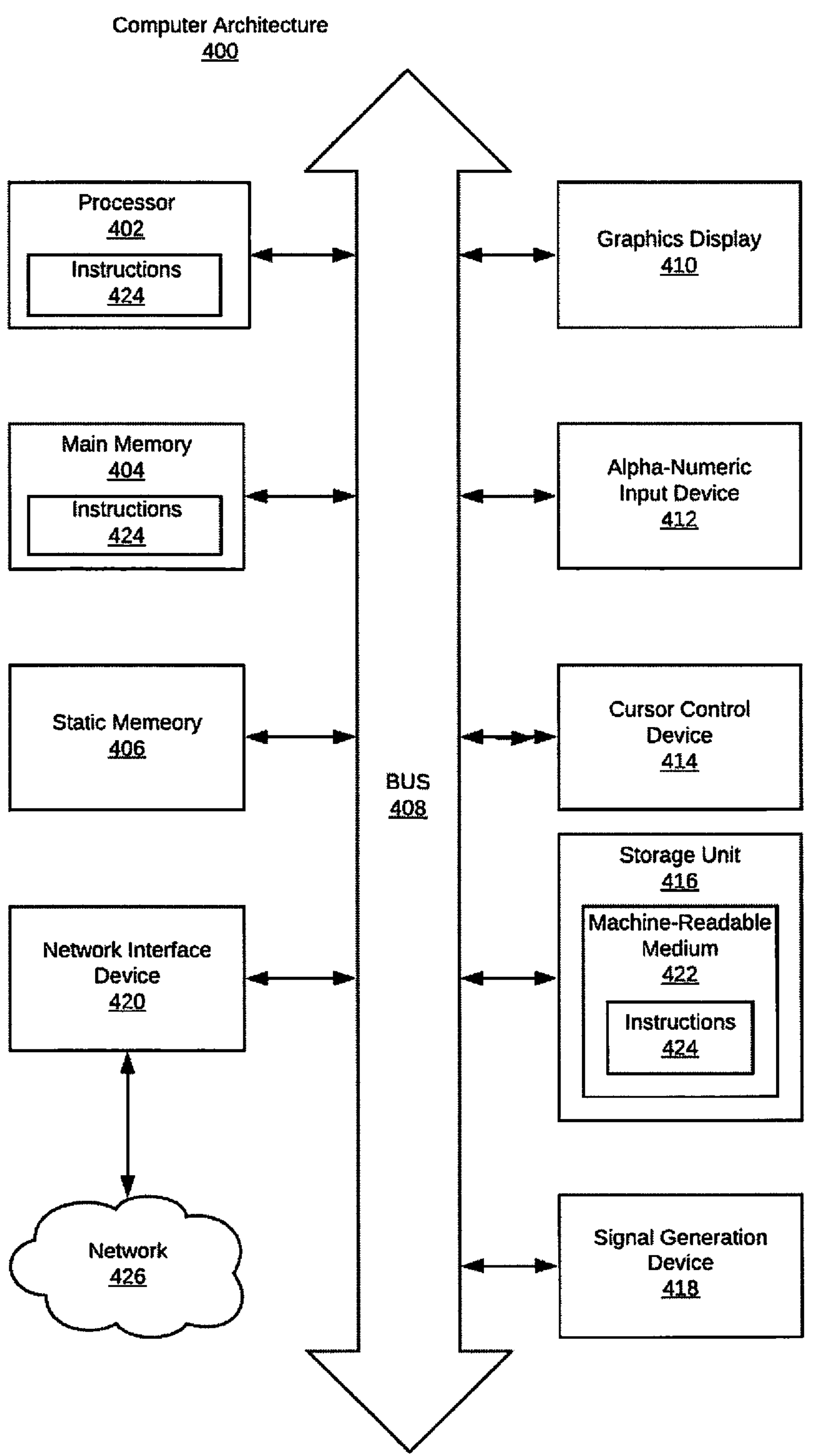
FIG. 4 is a block diagram illustrating components of an example machine for reading and executing instructions from a machine-readable medium.

FIG. 4 is a block diagram illustrating components of an example machine for reading and executing instructions from a machine-readable medium. Specifically, FIG. 4 shows a diagrammatic representation of network system 120 and client device 130 in the example form of a computer system 400. Thus, the computer system implements the method 200 of FIG. 2. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 700 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 404. The computer system may include a storage unit 416. The processor 402, memory 404, and the storage unit 416 communicate via a bus 408.

In addition, the computer system 400 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 716 includes a machine-readable medium 422 on which is stored instructions 424 (e.g., software) embodying any one or more of the methodologies or functions described herein. For example, the instructions 424 may include the functionalities of modules of the client device 130 or network system 120 described in FIG. 1. The instructions 424 may also reside, completely or at least partially, within the main memory 704 or within the processor 402 (e.g., within a processor's cache memory) during execution thereof by the computer system 700, the main memory 704 and the processor 402 also constituting machine-readable media. The instructions 424 may be transmitted or received over a network 426 (e.g., network 120) via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method for detecting changes in an agricultural field using one or more candidate fields having one or more attributes that correspond to one or more attributes of the agricultural field, the method comprising:

providing a computer system comprising a memory storing programming instructions thereon and at least one processor operably coupled to the memory so as execute the programming instructions and using the computer system to:

(i) acquire a time series of target images of the agricultural field;

(ii) for each target image, calculate a vegetation index value representative of the target image to produce a time series of vegetation index values of the target images;

(iii) calculate a target trend line from the time series of the vegetation index values of the target images;

(iv) acquire a time series of candidate images of said one or more candidate fields having one or more attributes that correspond to one or more attributes of the agricultural field;

(v) for each candidate image, calculate a vegetation index value representative of the candidate image to produce a time series of the vegetation index values of the candidate images;

(vi) calculate an expected trend line from the time series of the vegetation index values of the candidate images;

(vii) calculate a trend difference value as a difference between the target trend line and the expected trend line at spaced apart intervals of time;

(viii) calculate a representative value based upon an amount of change in the trend difference value by comparing the trend difference value of a current interval to the trend difference value of a previous interval;

(ix) calculate a representative value by comparing the target trend line to the expected trend line, (x) determine a deviation between the target trend line and the expected trend line when the representative value meets an alert threshold of alert criteria; and (xi) in response to the determination of the deviation, generating a product comprising one of a graphic, chart, or drawing for detecting the deviation as an anomaly in the agricultural field, wherein the product is distributed through the computer system to enable a data driven decision to modify and streamline agricultural operation of the agricultural field.

2. The method according to claim 1 including identifying the one or more candidate fields by identifying fields having (i) at least one attribute matching a corresponding attribute of said agricultural field and (ii) a distance from said agricultural field that is less than a prescribed distance threshold.

3. The method according to claim 1 including identifying the one or more candidate fields by identifying fields having (i) a crop type matching a crop type of said agricultural field, (ii) accessible weather data arranged to be associated with each candidate image, and (iii) a distance from said agricultural field that is less than a prescribed distance threshold.

4. The method according to claim 1 including computing the target trend line as a best fit line from the vegetation index values of the target images and computing the expected trend line as a best fit line from the vegetation index values of the candidate images.

5. The method according to claim 4 further comprising:

for each target image, calculating a single vegetation index value to represent that target image from an array of index values associated with that target image;

calculating the target trend line from the single vegetation index values of the target images;

for each candidate image, calculating a single vegetation index value to represent that candidate image from an array of index values associated with that candidate image; and calculating the expected trend line from the single vegetation index values of the candidate images.

6. The method according to claim 5 wherein each single vegetation index value is a mean value calculated from the associated array of index values.

7. The method according to claim 5 further comprising:

identifying outlier index values among the single vegetation index values as index values that have a distance from a corresponding one of the target trend line and the expected trend line that exceeds a prescribed outlier threshold; and recalculating the trend lines by ignoring the outlier index values.

8. The method according to claim 1 further comprising aligning growth stages of the time series of candidate images of the one or more candidate fields to growth stages of the time series of target images of the agricultural field prior to calculating and comparing the trend lines.

9. The method according to claim 8 including identifying the one or more candidate fields by identifying candidate fields having a seeding date and daily temperature values associated therewith, wherein the step of aligning growth stages of the time series of candidate images of the one or more candidate fields to growth stages of the time series of target images of the agricultural field further comprises:

calculating a growing degree days metric associated with the candidate images using the seeding date and the daily temperature values as inputs into a growth stage model; and aligning the growth stages of the candidate images with the growth stages of the target images using the calculated growing degree days metric.

10. The method according to claim 1 further comprising calculating and inserting one or more synthetic index values into one or more corresponding gaps in the time series of vegetation index values from which the target trend line is calculated.

11. The method according to claim 10 further comprising:

(a) calculating each synthetic index value by calculating a synthetic trend line from the time series of vegetation index values of the target images and locating where the synthetic trend line intersects the corresponding gap in the time series of vegetation values;

(b) calculating the target trend line as a best fit line from the time series of vegetation index values and the synthetic index values resulting from step (a).

12. The method according to claim 11 further comprising performing multiple iterations of step (a) in which the current synthetic trend line is calculated as a best fit line using (i) the time series of vegetation index values and (ii) the synthetic index values determined from a previous iteration of step (a).

13. The method according to claim 1 further comprising:

acquiring the time series of candidate images of a plurality of candidate fields;

identifying preferred candidate fields among the plurality of candidate fields; and calculating the expected trend line using only the time series candidate images from the preferred candidate fields.

14. The method according to claim 13 further comprising:

for each candidate field, (i) calculating a candidate trend line from the time series of candidate images of that candidate field and (ii) calculating a difference value by comparing the candidate trend line to the target trend line; and using the difference values to identify the preferred candidate fields.

15. The method according to claim 14 including calculating the difference value for each candidate field using a portion of the candidate trend line representing only a subset of the time series of candidate images associated with the candidate field.

16. The method according to claim 15 further comprising aligning growth stages of the candidate trend lines of the preferred candidate fields prior to calculating the expected trend line from the preferred candidate fields.

17. The method according to claim 1 wherein the alert criteria include an upper alert threshold and a lower alert threshold, the method comprising:

generating an alert when the representative value exceeds the upper alert threshold indicative of the target trend line increasing at a faster rate than the expected trend line or the target trend line decreasing at a slower rate than the expected trend line; and generating an alert when the representative value falls below a lower alert threshold indicative of the target trend line decreasing at a faster rate than the expected trend line or the target trend line increasing at a slower rate than the expected trend line.

* * * * *